United States Patent
Baek et al.

(10) Patent No.: US 12,542,773 B2
(45) Date of Patent: Feb. 3, 2026

(54) REMOTE AUTHORIZATION METHOD AND ELECTRONIC DEVICE FOR PERFORMING SAME METHOD

(71) Applicant: Samsung Electronics Co., Ltd., Suwon-si (KR)

(72) Inventors: Kyounglim Baek, Suwon-si (KR); Joohyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 18/396,238

(22) Filed: Dec. 26, 2023

(65) Prior Publication Data
US 2024/0129300 A1    Apr. 18, 2024

Related U.S. Application Data

(63) Continuation of application No. PCT/KR2022/009301, filed on Jun. 29, 2022.

(30) Foreign Application Priority Data

Aug. 9, 2021 (KR) .................. 10-2021-0104375

(51) Int. Cl.
*H04L 9/40* (2022.01)
*G06F 21/30* (2013.01)
(Continued)

(52) U.S. Cl.
CPC ............ *H04L 63/083* (2013.01); *G06F 21/30* (2013.01); *H04L 9/3226* (2013.01);
(Continued)

(58) Field of Classification Search
CPC ... H04L 63/083; H04L 9/3226; H04L 63/062; H04L 63/0876; H04L 63/10; H04L 9/40; H04L 12/12; G06F 21/30; H04N 21/25808
See application file for complete search history.

(56) References Cited

U.S. PATENT DOCUMENTS

| 8,661,515 B2 | 2/2014 | Meylemans et al. |
| 9,172,687 B2 | 10/2015 | Baghdasaryan et al. |

(Continued)

FOREIGN PATENT DOCUMENTS

| EP | 1 162 531 A2 | 12/2001 |
| JP | 2017-016397 A | 1/2017 |

(Continued)

OTHER PUBLICATIONS

Matei Ciobanu Morogan; A Local Authentication Module for Mobile Devices; PCC workshop 2001; <http://www.pcc.lth.se/events/workshops/2001/pccposters/Matei.pdf>.; Apr. 2001.

(Continued)

*Primary Examiner* — Ramy M Osman
(74) *Attorney, Agent, or Firm* — Jefferson IP Law, LLP

(57) ABSTRACT

A remote authorization method and an electronic device for performing the method are provided. The remote authorization method includes the steps of identifying information of a target device connected to a network, transmitting a request for remote login to the target device to an account server, in response to the remote login request, receiving, from the account server, a remote login code for identifying the remote login request and a remote login method determined according to the information of the target device, requesting a terminal authorization code from the target device by using the remote login code, receiving an input of the terminal authorization code, which is output by the target device according to the remote login method, from a user, (Continued)

transmitting the terminal authorization code to the account server, and receiving a login key for remote login of the target device from the account server, and transmitting the login key to the target device.

17 Claims, 11 Drawing Sheets

(51) Int. Cl.
*H04L 9/32* (2006.01)
*H04N 21/258* (2011.01)

(52) U.S. Cl.
CPC ........ *H04L 63/062* (2013.01); *H04L 63/0876* (2013.01); *H04L 63/10* (2013.01); *H04N 21/25808* (2013.01)

(56) References Cited

U.S. PATENT DOCUMENTS

| | | | | |
|---|---|---|---|---|
| 9,992,677 | B2* | 6/2018 | Kim | H04L 63/08 |
| 10,027,643 | B2* | 7/2018 | Kim | H04L 12/282 |
| 10,708,774 | B2* | 7/2020 | Koo | H04W 12/068 |
| 11,960,582 | B2* | 4/2024 | Lee | G06F 21/32 |
| 2013/0254858 | A1* | 9/2013 | Giardina | G06F 21/42 |
| | | | | 726/7 |
| 2014/0007211 | A1* | 1/2014 | Yang | H04L 63/18 |
| | | | | 726/7 |
| 2015/0236908 | A1* | 8/2015 | Kim | H04L 12/2825 |
| | | | | 709/221 |
| 2016/0234213 | A1* | 8/2016 | Kim | H04L 63/062 |
| 2016/0308678 | A1* | 10/2016 | Bhatnagar | H04L 9/3228 |
| 2016/0314462 | A1* | 10/2016 | Hong | H04L 63/083 |
| 2017/0006471 | A1* | 1/2017 | Kim | H04W 12/06 |
| 2017/0244688 | A1* | 8/2017 | Kim | H04L 63/107 |
| 2018/0227128 | A1* | 8/2018 | Church | H04L 9/3247 |
| 2021/0385213 | A1* | 12/2021 | Yoo | G06Q 20/405 |
| 2022/0405375 | A1* | 12/2022 | Lin | H04L 9/3231 |

FOREIGN PATENT DOCUMENTS

| | | |
|---|---|---|
| KR | 10-1044937 B1 | 6/2011 |
| KR | 10-2014-0046122 A | 4/2014 |
| KR | 10-1510878 B1 | 4/2015 |
| KR | 10-2016-0101829 A | 8/2016 |
| KR | 10-1747296 B1 | 6/2017 |
| KR | 10-1980039 B1 | 5/2019 |
| KR | 10-2020-0032073 A | 3/2020 |

OTHER PUBLICATIONS

International Search Report with Written Opinion and English translation dated Oct. 4, 2022; International Appln. No. PCT/KR2022/009301.

* cited by examiner

```
<?xml version="1.0" encoding="UTF-8"?>
- <root xmlns="urn:schemas-upnp-org:device-1-0">
    - <device>
          <deviceType>urn:schemas-upnp-org:device:TV:1</deviceType>
          <friendlyName>QLED TV</friendlyName>
        - <serviceList>
            - <service>
                  <serviceType>urn:schemas-upnp-org:service:account:1</serviceType>
                  <controlURL>/ctl/L3F</controlURL>
                  <SCPDURL>/L3F.xml</SCPDURL>
              </service>
          </serviceList>
      </device>
  </root>
```

FIG. 5A

```xml
<?xml version="1.0"?>
- <scpd xmlns="urn:schemas-upnp-org:service-1-0">
    - <specVersion>
        <major>1</major>
        <minor>0</minor>
      </specVersion>
    - <actionList>
        - <action>
            <name>VerificationCode</name>
          - <argumentList>
              - <argument>
                  <name>remoteCode</name>
                  <direction>in</direction>
                  <relatedStateVariable>remoteCode</relatedStateVariable>
                </argument>
            </argumentList>
          </action>
        - <action>
            <name>SingIn</name>
          - <argumentList>
              - <argument>
                  <name>remoteKey</name>
                  <direction>in</direction>
                  <relatedStateVariable>remoteKey</relatedStateVariable>
                </argument>
            </argumentList>
          </action>
        - <action>
            <name>SingOut</name>
          - <argumentList>
              - <argument>
                  <name>remoteKey</name>
                  <direction>in</direction>
                  <relatedStateVariable>remoteKey</relatedStateVariable>
                </argument>
            </argumentList>
          </action>
      </actionList>
    - <serviceStateTable>
        - <stateVariable sendEvents="no">
            <name>remoteCode</name>
            <dataType>string</dataType>
          </stateVariable>
        - <stateVariable sendEvents="no">
            <name>remoteKey</name>
            <dataType>string</dataType>
          </stateVariable>
      </serviceStateTable>
  </scpd>
```

FIG. 5B

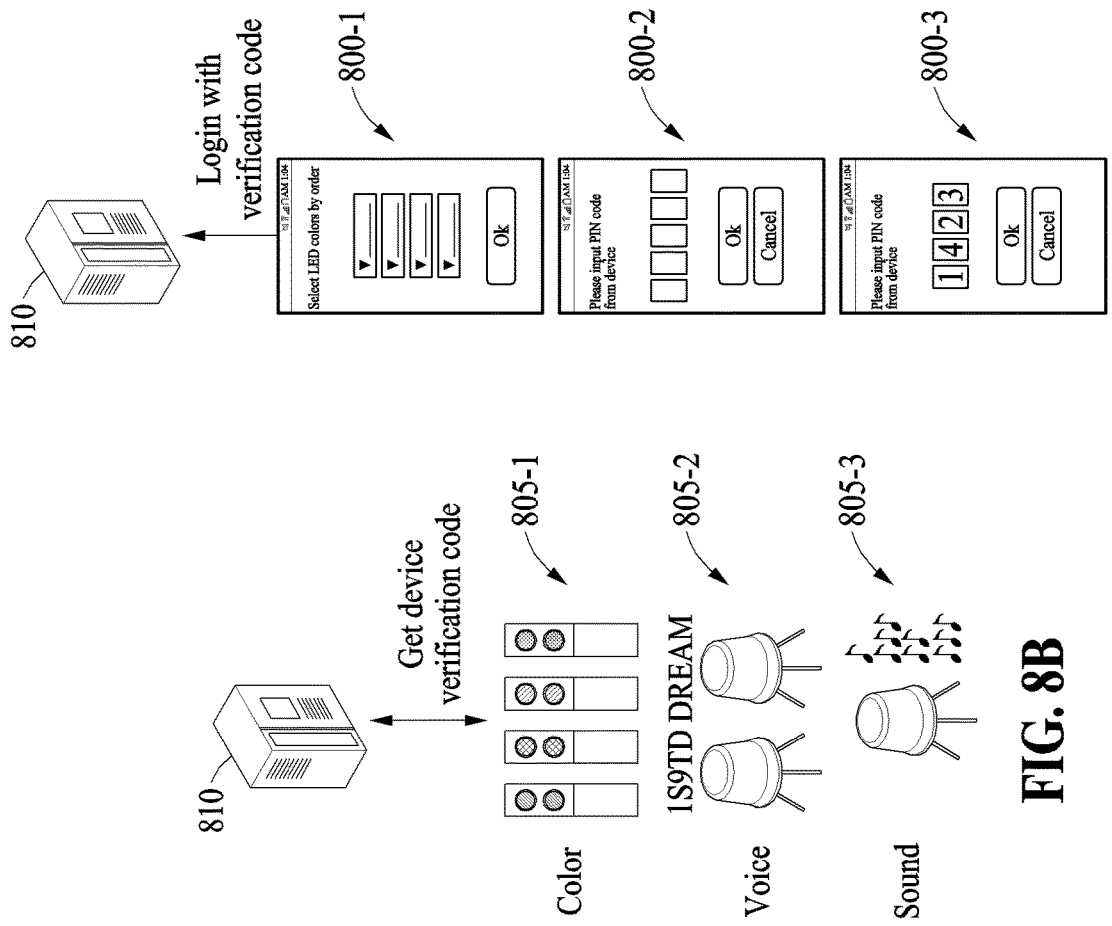
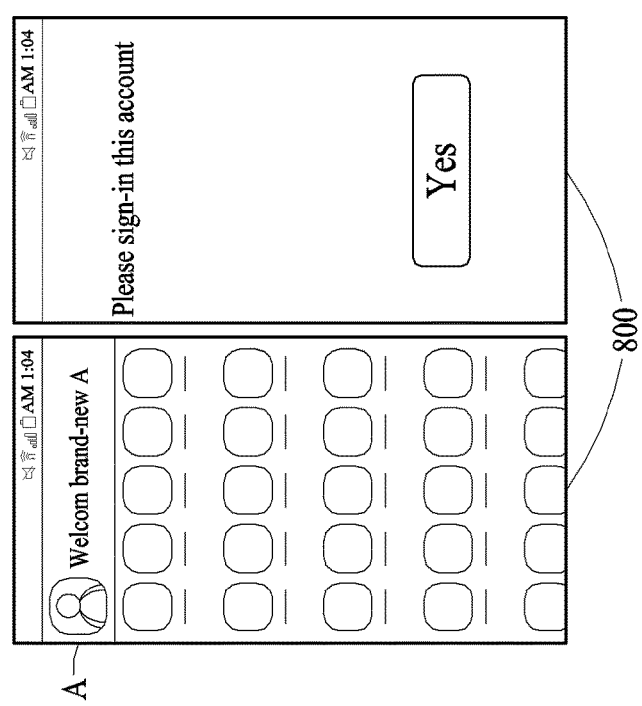
FIG. 8A
FIG. 8B
FIG. 8C

REMOTE AUTHORIZATION METHOD AND ELECTRONIC DEVICE FOR PERFORMING SAME METHOD

CROSS-REFERENCE TO RELATED APPLICATION(S)

This application is a continuation application, claiming priority under § 365(c), of an International application No. PCT/KR2022/009301, filed on Jun. 29, 2022, which is based on and claims the benefit of a Korean patent application number 10-2021-0104375, filed on Aug. 9, 2021, in the Korean Intellectual Property Office, the disclosure of which is incorporated by reference herein in its entirety.

BACKGROUND

1. Field

The disclosure relates to a remote authorization method and an electronic device performing the remote authorization method.

2. Description of Related Art

There is a method of searching for devices that provide an account service connected to a network, performing authorization with a verification code, and allowing a device to be logged in to a user account.

This is an authorization method for sharing authorization between services, which may receive an access token for a user resource and access a user resource of a specific service without direct use of an identifier (ID) or a password.

For browserless and input-constrained devices, this method may expose a user verification code and a verification uniform resource locator (URL) to a user, and allow the user to authorize an account by inputting the user verification code onto a verification URL page. After the user account is authorized, the device may check whether user authorization is completed through continuous polling with an authorization server and receive the access token as a response.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a remote authorization method and an electronic device that searches for devices providing an account service on a network, determines a remote login method or remote logout method of outputting a terminal verification code according to a means by which a device outputs the terminal verification code, and allows the device to be logged in to or logged out of a user account.

Another aspect of the disclosure is to provide a remote authorization method and an electronic device that allows a plurality of target devices to be simultaneously logged in to or logged out of a user account.

Additional aspects will be set forth in part in the description which follows and, in part, will be apparent from the description, or may be learned by practice of the presented embodiments.

In accordance with an aspect of the disclosure, a remote authorization method is provided. The remote authorization method includes identifying information of a target device connected to a network, transmitting, to an account server, a remote login request for the target device, in response to the remote login request, receiving, from the account server, a remote login code for identifying the remote login request and a remote login method determined according to the information of the target device, requesting the target device for a terminal verification code using the remote login code, receiving, from a user, the terminal verification code output by the target device according to the remote login method, transmitting the terminal verification code to the account server, and receiving a login key for remote login of the target device from the account server, and transmitting the login key to the target device.

In accordance with another aspect of the disclosure, an electronic device performing a remote authorization method is provided. The electronic device includes a processor, wherein the processor may be configured to identify information of a target device connected to a network, and transmit a remote login request for the target device to an account server, in response to the remote login request, receive, from the account server, a remote login code for identifying the remote login request and a remote login method determined according to the information of the target device, request the target device for a terminal verification code using the remote login code, receive, from a user, the terminal verification code output by the target device according to the remote login method, transmit the terminal verification code to the account server, and receive a login key for remote login of the target device from the account server, and transmit the login key to the target device.

In accordance with another aspect of the disclosure, an electronic device performing a remote authorization method is provided. The electronic device includes a processor, wherein the processor may be configured to transmit information of the electronic device to a user terminal, receive a request for a terminal verification code using a remote login code from the user terminal, request an account server for the terminal verification code, output the terminal verification code received from the account server, receive a login key from the user terminal, request the account server for remote login using the login key, and receive an access token in response to the remote login.

In accordance with another aspect of the disclosure, an electronic device performing a remote authorization method is provided. The electronic device includes a processor, wherein the processor may be configured to transmit information of the electronic device to a user terminal, receive a login key from the user terminal, request an account server for remote login using the login key, and receive an access token in response to the remote login, wherein the login key may be received by the user terminal in response to a terminal verification code that is output to a target device remotely logged in at the same time with the electronic device and is transmitted to the account server.

According to various embodiments of the disclosure, determining a remote login method or remote logout method of outputting a terminal verification code according to an output device provided in a target device and outputting the terminal verification code to the output device may enable even a target device without a display screen for exposing a user authorization code and a uniform resource locator (URL) to be remotely logged in or remotely logged out with a user account.

According to various embodiments of the disclosure, it is possible to allow a plurality of target devices to be remotely logged in or out at the same time with a user account.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 5A and 5B are diagrams illustrating a description of an account service according to various embodiments of the disclosure;

FIGS. 8A, 8B, and 8C are diagrams illustrating a terminal verification code output from an electronic device and a screen for inputting the terminal verification code according to various embodiments of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
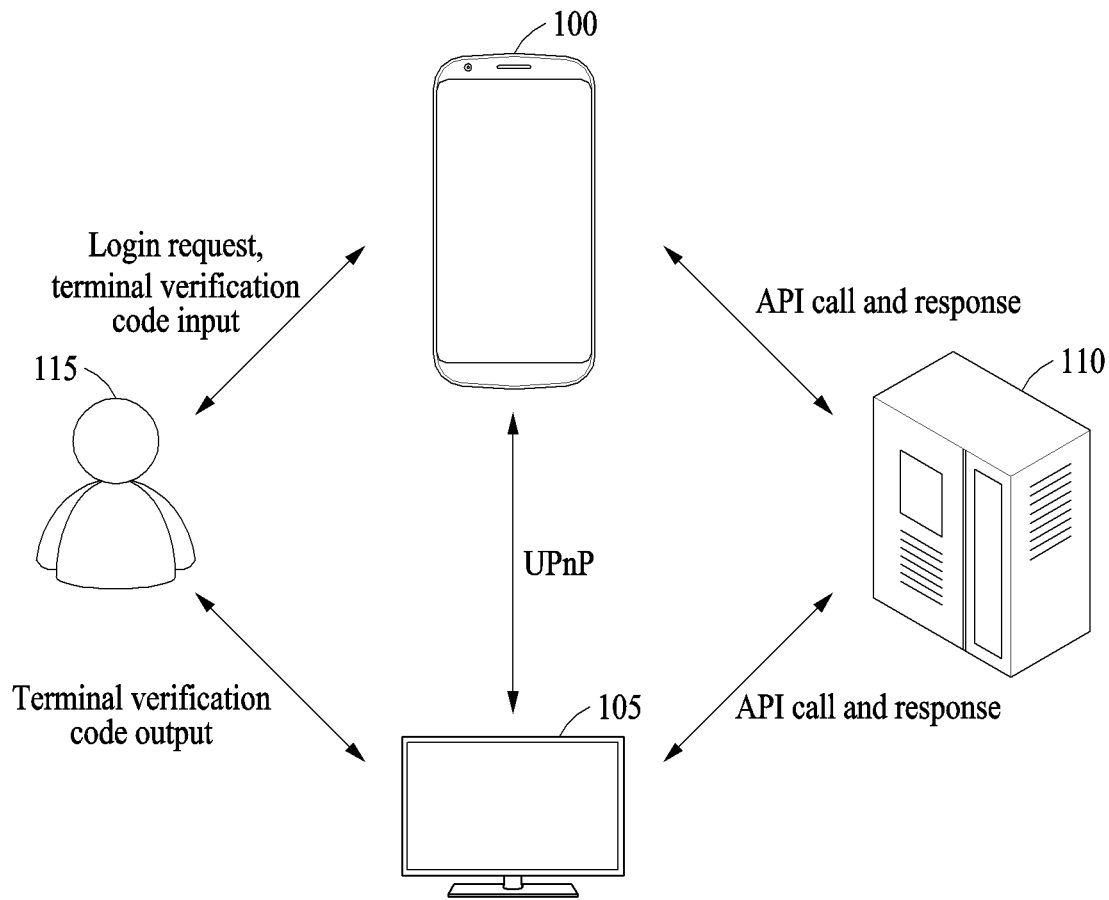
FIG. 1 is a diagram illustrating operations of an electronic device performing a remote login method according to an embodiment of the disclosure.

FIG. 1 is a diagram illustrating operations of an electronic device performing a remote login method according to an embodiment of the disclosure.

Referring to FIG. 1, an electronic device 100 according to an embodiment may communicate with a target device 105 connected to a network and an account server 110. For example, the electronic device 100 may communicate with the target device 105 using the universal plug and play (UPnP) protocol that provides search and control for devices connected on the same network. For example, the electronic device 100 may communicate with the account server 110 using an application programming interface (API) which is an interface for controlling functions provided by an operating system (OS) or programming language.

The electronic device 100 may receive a login request from a user 115 and receive a terminal verification code output from the target device 105. The electronic device 100 may be communicatively connected to the target device 105 and the account server 110 to allow the target device 105 to perform user authorization with the account server 110 and to be logged in remotely. The target device 105 may receive an access token from the account server 110.

The electronic device 100 may receive, from the user, the terminal verification code output by the target device 105. The electronic device 100 may transmit the input terminal verification code to the account server 110 and receive a login key from the account server 110. A terminal device may transmit the received login key to the target device 105. The target device 105 may perform user authorization with the account server 110 using the login key.

The target device 105 may communicate with the electronic device 100 and the account server 110. The target device 105 may communicate with the electronic device 100 using the UPnP protocol and communicate with the account server 110 using the API.

Figure 2:
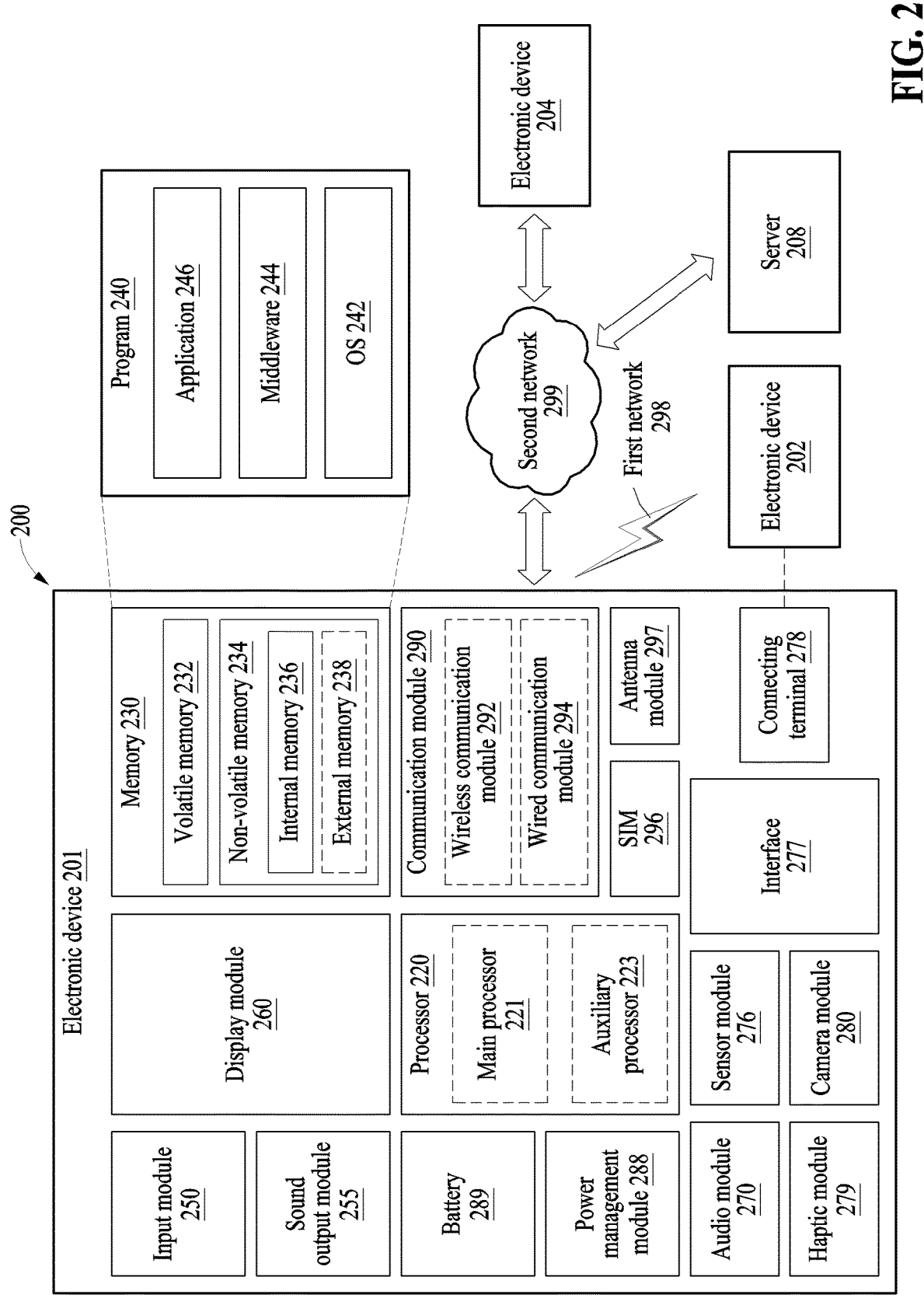
FIG. 2 is a block diagram illustrating an electronic device in a network environment according to an embodiment of the disclosure.

FIG. 2 is a block diagram illustrating an electronic device in a network environment according to an embodiment of the disclosure.

FIG. 2 is a block diagram illustrating an electronic device 201 in a network environment 200 according to an embodiment of the disclosure. Referring to FIG. 2, the electronic device 201 (e.g., the electronic device 100 of FIG. 1) in the network environment 200 may communicate with an electronic device 202 (e.g., the target device 105 of FIG. 1) via a first network 298 (e.g., a short-range wireless communication network), or communicate with at least one of an electronic device 204 (e.g., the target device 105 of FIG. 1) and a server 208 (e.g., the account server 110 of FIG. 1) via a second network 299 (e.g., a long-range wireless communication network). The electronic device 201 may communicate with the electronic device 204 via the server 208. The electronic device 201 may include a processor 220, a memory 230, an input module 250, a sound output module 255, a display module 260, an audio module 270, and a sensor module 276, an interface 277, a connecting terminal 278, a haptic module 279, a camera module 280, a power management module 288, a battery 289, a communication module 290, a subscriber identification module (SIM) 296, or an antenna module 297. In some embodiments, at least one (e.g., the connecting terminal 278) of the above components may be omitted from the electronic device 201, or one or more other components may be added to the electronic device 201. In some embodiments, some (e.g., the sensor module 276, the camera module 280, or the antenna module 297) of the components may be integrated as a single component (e.g., the display module 260).

The processor 220 may execute, for example, software (e.g., a program 240) to control at least one other component (e.g., a hardware or software component) of the electronic device 201 connected to the processor 220, and may perform various data processing or computation. According to an embodiment, as at least a part of data processing or computation, the processor 220 may store a command or data received from another component (e.g., the sensor module 276 or the communication module 290) in a volatile memory 232, process the command or data stored in the volatile memory 232, and store resulting data in a non-volatile memory 234. The processor 220 may include a main processor 21 (e.g., a central processing unit (CPU) or an application processor (AP)) or an auxiliary processor 223 (e.g., a graphics processing unit (GPU), a neural processing unit (NPU), an image signal processor (ISP), a sensor hub processor, or a communication processor (CP)) that is operable independently from or in conjunction with, the main processor 221. For example, when the electronic device 201 includes the main processor 221 and the auxiliary processor 223, the auxiliary processor 223 may be adapted to consume less power than the main processor 221 or to be specific to a specified function. The auxiliary processor 223 may be implemented separately from the main processor 221 or as a part of the main processor 221.

The auxiliary processor 223 may control at least some of functions or states related to at least one (e.g., the display module 260, the sensor module 276, or the communication module 290) of the components of the electronic device 201, instead of the main processor 221 while the main processor 221 is in an inactive (e.g., sleep) state or along with the main processor 221 while the main processor 221 is an active state (e.g., executing an application). The auxiliary processor 223 (e.g., an ISP or a CP) may be implemented as a portion of another component (e.g., the camera module 280 or the communication module 290) that is functionally related to the auxiliary processor 223. The auxiliary processor 223 (e.g., an NPU) may include a hardware structure specifically for artificial intelligence (AI) model processing. An AI model may be generated by machine learning. The learning may be performed by, for example, the electronic device 201, in which the AI model is performed, or performed via a separate server (e.g., the server 208). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 230 may store various pieces of data used by at least one component (e.g., the processor 220 or the sensor module 276) of the electronic device 201. The various pieces of data may include, for example, software (e.g., the program 240) and input data or output data for a command related thereto. The memory 230 may include the volatile memory 232 or the non-volatile memory 234.

The program 240 may be stored as software in the memory 230 and may include, for example, an operating system (OS) 242, middleware 244, or an application 246.

The input module 250 may receive, from outside (e.g., a user) the electronic device 201, a command or data to be used by another component (e.g., the processor 220) of the electronic device 201. The input module 250 may include, for example, a microphone, a mouse, a keyboard, a key (e.g., a button), or a digital pen (e.g., a stylus pen).

The sound output module 255 may output a sound signal to the outside of the electronic device 201. The sound output module 255 may include, for example, a speaker or a receiver. The speaker may be used for general purposes, such as playing multimedia or playing a recording. The receiver may be used to receive an incoming call. The receiver may be implemented separately from the speaker or as a part of the speaker.

The display module 260 may visually provide information to the outside (e.g., a user) of the electronic device 201. The display module 260 may include, for example, a display, a hologram device, or a projector, and a control circuitry to control its corresponding one of the displays, the hologram device, and the projector. The display module 260 may include a touch sensor adapted to sense a touch, or a pressure sensor adapted to measure an intensity of a force of the touch.

The audio module 270 may convert sound into an electric signal or vice versa. The audio module 270 may obtain the sound via the input module 250 or output the sound via the sound output module 255 or an external electronic device (e.g., the electronic device 202, such as a speaker or headphones) directly or wirelessly connected to the electronic device 201.

The sensor module 276 may detect an operational state (e.g., power or temperature) of the electronic device 201 or an environmental state (e.g., a state of a user) external to the electronic device 201 and generate an electric signal or data value corresponding to the detected state. The sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used by the electronic device 201 to couple with an external electronic device (e.g., the electronic device 202) directly (e.g., by wire) or wirelessly. The interface 277 may include, for example, a high-definition multimedia interface (HDMI), a universal serial bus (USB) interface, a secure digital (SD) card interface, or an audio interface.

The connecting terminal 278 may include a connector via which the electronic device 201 may physically connect to an external electronic device (e.g., the electronic device 202). The connecting terminal 278 may include, for example, an HDMI connector, a USB connector, an SD card connector, or an audio connector (e.g., a headphones connector).

The haptic module 279 may convert an electric signal into a mechanical stimulus (e.g., a vibration or a movement) or an electrical stimulus, which may be recognized by a user via their tactile sensation or kinesthetic sensation. The haptic module 279 may include, for example, a motor, a piezoelectric element, or an electric stimulator.

The camera module 280 may capture a still image and moving images. The camera module 280 may include one or more lenses, image sensors, ISPs, and flashes.

The power management module 288 may manage power supplied to the electronic device 201. The power management module 288 may be implemented as, for example, at least a part of a power management integrated circuit (PMIC).

The battery 289 may supply power to at least one component of the electronic device 201. The battery 289 may include, for example, a primary cell, which is not rechargeable, a secondary cell, which is rechargeable, or a fuel cell.

The communication module 290 may support establishing a direct (e.g., wired) communication channel or a wireless communication channel between the electronic device 201 and an external electronic device (e.g., the electronic device 202, the electronic device 204, or the server 208) and performing communication via the established communication channel. The communication module 290 may include one or more CPs that are operable independently from the processor 220 (e.g., an AP) and that support direct (e.g., wired) communication or wireless communication. The communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device, for example, the electronic device 204, via the first network 298 (e.g., a short-range communication network, such as Bluetooth™, wireless-fidelity (Wi-Fi) direct, or infrared data association (IrDA)) or the second network 299 (e.g., a long-range communication network, such as a legacy cellular network, a $5^{th}$ generation (5G) network, a next-generation communication network, the Internet, or a computer network (e.g., an LAN or a wide area network (WAN)). These various types of communication modules may be implemented as a single component (e.g., a single chip), or may be implemented as multiple components (e.g., multiple chips) separate from each other. The wireless communication module 292 may identify and authenticate the electronic device 201 in a communication network, such as the first network 298 or the second network 299, using subscriber information (e.g., international mobile subscriber identity (IMSI)) stored in the SIM 296.

The wireless communication module 292 may support a 5G network after a $4^{th}$ generation (4G) network, and a next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 292 may support a high-frequency band (e.g., an mmWave band) to achieve, e.g., a high data transmission rate. The wireless communication module 292 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 292 may support various requirements specified in the electronic device 201, an external electronic device (e.g., the electronic device 204), or a network system (e.g., the second network 299). The wireless communication module 292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 297 may transmit or receive a signal or power to or from the outside (e.g., an external electronic device) of the electronic device 201. The antenna module 297 may include an antenna including a radiating element including a conductive material or a conductive pattern formed in or on a substrate (e.g., a printed circuit board (PCB)). The antenna module 297 may include a plurality of antennas (e.g., an antenna array). In such a case, at least one antenna appropriate for a communication scheme used in a communication network, such as the first network 298 or the second network 299, may be selected by, for example, the communication module 290 from the plurality of antennas. The signal or power may be transmitted or received between the communication module 290 and the external electronic device via the at least one selected antenna. According to an embodiment, another component (e.g., a radio frequency integrated circuit (RFIC)) other than the radiating element may be additionally formed as a part of the antenna module 297.

According to various embodiments, the antenna module 297 may form an mmWave antenna module. The mmWave antenna module may include a PCB, an RFIC on a first surface (e.g., a bottom surface) of the PCB or adjacent to the first surface of the PCB and capable of supporting a designated high-frequency band (e.g., a mmWave band), and a plurality of antennas (e.g., an antenna array) disposed on a second surface (e.g., a top or a side surface) of the PCB, or adjacent to the second surface of the PCB and capable of transmitting or receiving signals in the designated high-frequency band.

At least some of the above-described components may be coupled mutually and exchange signals (e.g., commands or data) therebetween via an inter-peripheral communication scheme (e.g., a bus, general-purpose input and output (GPIO), serial peripheral interface (SPI), or mobile industry processor interface (MIPI)).

According to an embodiment, commands or data may be transmitted or received between the electronic device 201 and the external electronic device (e.g., the electronic device 204) via the server 208 coupled with the second network 299. Each of the external electronic devices (e.g., the electronic device 202 or 204) may be a device of the same type as or a different type from the electronic device 201. All or some of operations to be executed by the electronic device 201 may be executed by one or more of the external electronic devices (e.g., the electronic devices 202 and 204 and the server 208). For example, if the electronic device 201 needs to perform a function or a service automatically, or in response to a request from a user or another device, the electronic device 201, instead of, or in addition to, executing the function or service, may request one or more external electronic devices to perform at least a part of the function or service. The one or more external electronic devices receiving the request may perform the at least part of the function or the service requested, or an additional function or an additional service related to the request and may transfer a result of the performance to the electronic device 201. The electronic device 201 may provide the result, with or without further processing of the result, as at least part of a response to the request. To that end, cloud computing, distributed computing, mobile edge computing (MEC), or client-server computing technology may be used, for example. The electronic device 201 may provide ultra-low latency services using, e.g., distributed computing or MEC. According to another embodiment, the external electronic device (e.g., the electronic device 204) may include an Internet-of-things (IoT) device. The server 108 may be an intelligent server using machine learning and/or a neural network. The external electronic device (e.g., the electronic device 204) or the server 108 may be included in the second network 299. The electronic device 201 may be applied to intelligent services (e.g., a smart home, a smart city, a smart car, or healthcare) based on 5G communication technology or IoT-related technology.

According to an embodiment, the electronic device 201 may include a color display module (not shown). The color display module may include a light source output device such as a lamp or a light-emitting diode (LED) that outputs various colors (e.g., red, yellow, blue, etc.). According to various embodiments, the color display module may output a combination of colors by sequentially outputting the colors at predetermined time intervals. According to various embodiments, the color display module may include a plurality of light source output devices and, in this case, may simultaneously output combinations of colors, using the plurality of light source output devices.

Figure 3:
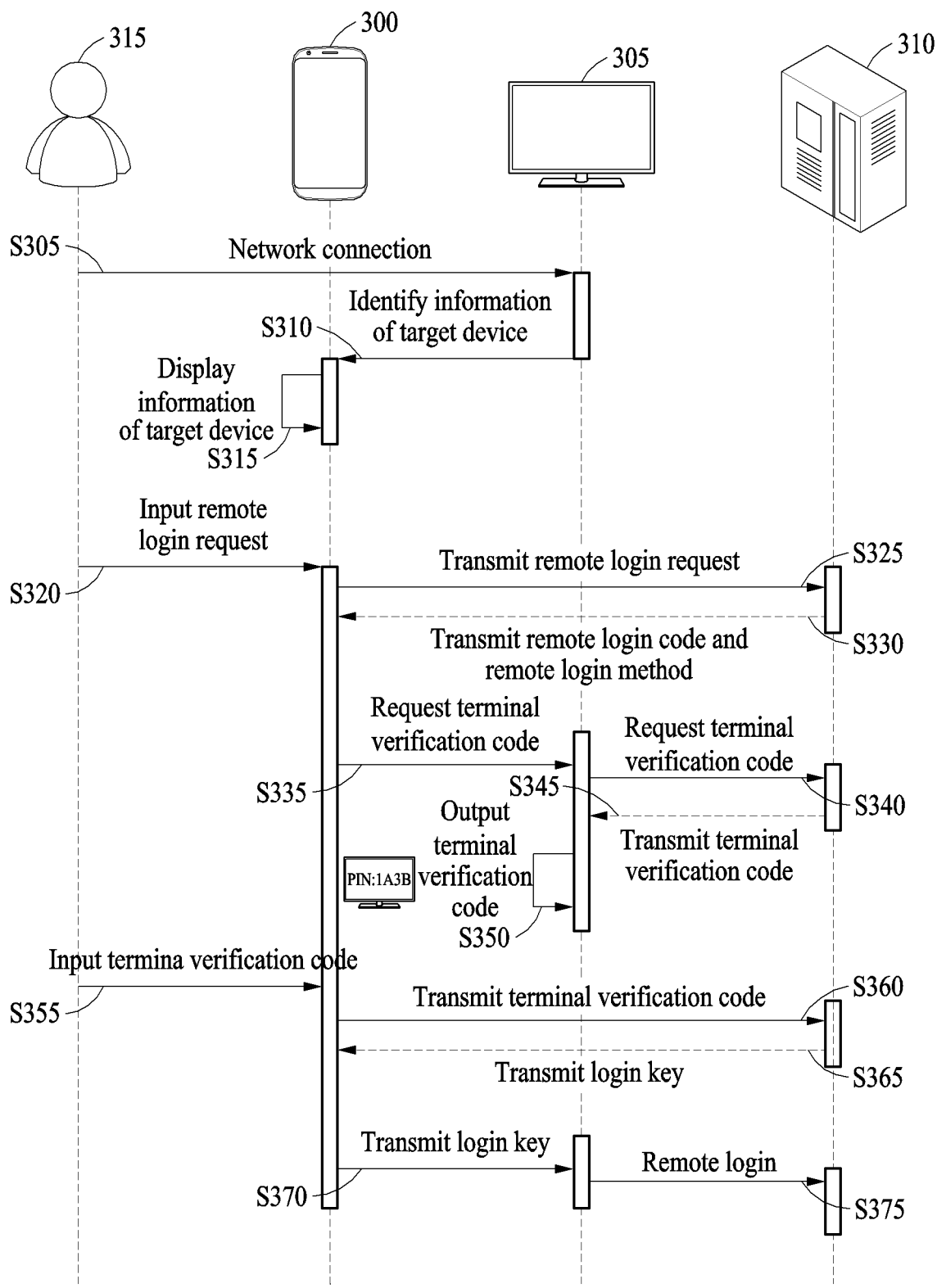
FIG. 3 is a diagram illustrating a remote authorization method for remote login of a target device according to an embodiment of the disclosure.

FIG. 3 is a diagram illustrating a remote authorization method for remote login of a target device according to an embodiment of the disclosure.

Referring to FIG. 3, in operation S305, a target device 305 (e.g., the target device 105 of FIG. 1, and the electronic devices 202 and 204 of FIG. 2) may be connected to a network (e.g., the first network 298 and the second network 299 of FIG. 2).

In operation S310, an electronic device 300 (e.g., the electronic device 100 of FIG. 1 and the electronic device 201 of FIG. 2) performing a remote login method according to an embodiment may identify information of the target device 305 connected to the network. The electronic device 300 may be a device that receives an input from a user 315 to allow the target device 305 to be remotely logged in, which may also be referred to as a user terminal.

For example, the information of the target device 305 may include information about whether the target device 305 includes an account service that performs remote login. For example, the information of the target device 305 may include information about an output device that outputs a terminal verification code. The information of the target device 305 may include a device name (i.e., a device identifier (ID)), a device type, an Internet protocol (IP) address, and a product name.

According to an embodiment, the target device 305 may further include at least one of a display module (e.g., the display module 260 of FIG. 2) that displays a personal identification number (PIN) code or a quick response (QR) code, a color display module that displays a combination of colors, or a sound output module (e.g., the sound output module 255 of FIG. 2) that outputs a combination of voices or sounds. The display module, the color display module, and the sound output module of the target device 305 may be the output device that outputs the terminal verification code.

For example, information about the color display module may include the number of colors that may be displayed simultaneously and the colors that may be displayed, and information about the sound output module may include information as to whether a voice is uttered.

According to an embodiment, the electronic device 300 may receive a message multicast from the target device 305. For example, the electronic device 300 may determine whether the target device 305 may be able to perform remote login. As described below with reference to FIGS. 5A and 5B, the electronic device 300 may identify whether the target device 305 may be able to perform remote login, that is, whether the target device 305 supports the account service, using a description of the target device 305.

For example, the electronic device 300 may identify the output device that outputs the terminal verification code from the target device 305. For example, the target device 305 may include, as the output device that outputs the terminal verification code, the display module (e.g., the display module 260 of FIG. 2), the color display module, and the sound output module (e.g., the sound output module 255 of FIG. 2).

According to an embodiment, the electronic device 300 may multicast a message to the target device 305. For example, in response to the message from the target device 305, the electronic device 300 may identify whether remote login is to be performed and the information about the output device that outputs the terminal verification code from the target device 305.

For example, the electronic device 300 and the target device 305 may communicate through a universal plug and play (UPnP) protocol. The electronic device 300 and the target device 305 may multicast messages using the UPnP protocol.

For example, the electronic device 300 may multicast a simple service discovery protocol (SSDP) search message to search for the target device 305 connected to the network and search for a service of the target device 305.

For example, the electronic device 300 may control the target device 305 connected to the network using a simple object access protocol (SOAP).

For example, the electronic device 300 may search for or control the target device 305 connected to the network using the UPnP protocol. For example, the electronic device 300 may be construed as a control point module that searches for or controls a target device connected to a network.

In operation S315, the electronic device 300 may display the information of the target device 305. For example, the electronic device 300 may display the information of the target device 305 on the display module (e.g., the display module 260 of FIG. 2).

In operation S320, the electronic device 300 may receive a remote login request from the user 315 (e.g., the user 115 of FIG. 1). For example, the electronic device 300 may display information of a plurality of target devices 305 connected to the network in operation S315 and receive the remote login request for the target device 305 that is a target of remote login among the plurality of target devices 305.

According to an embodiment, in operation S325, the electronic device 300 may transmit the remote login request to an account server 310 (e.g., the account server 110 of FIG. 1 and the server 208 of FIG. 2). The remote login request may include the information of the target device 305 on which remote login is to be performed. In operation S330, the electronic device 300 may receive a remote login code and a remote login method from the account server 310. The account server 310 may transmit the remote login code and the remote login method to the electronic device 300 in response to the remote login request.

For example, the electronic device 300, the target device 305, and the account server 310 may identify the remote login request using the remote login code. As the electronic device 300 transmits the remote login request to the account server 310, a plurality of operations may be performed for remote login of the target device 305. In this example, identifying the remote login request may be construed as identifying whether a plurality of operations for remote login of the target device 305 are in the same procedure.

When performing the operations to perform remote login among the electronic device 300, the target device 305, and the account server 310, the remote login code may be used to identify whether the remote login procedure is for the same target device 305.

When the remote login code is the same, the electronic device 300, the target device 305, and the account server 310 may identify the operations as the ones in the same remote login procedure. The operations in the same remote login procedure may be construed as operations that are performed upon the same remote login request.

For example, when the remote login code in operation S335 of requesting the target device 305 for the terminal verification code by the electronic device 300 and the remote login code in operation S360 of transmitting the terminal verification code from the electronic device 300 to the account server 310 are the same, it may be identified that the target device 305 and the account server 310 may perform the operations in the same remote login procedure.

When the remote login code is different, it may be identified that the electronic device 300, the target device 305, and the account server 310 may perform operations in different remote login procedures. For example, when the same target device 305 receives a request for a terminal verification code from the electronic device 300 using different remote login codes, it may be identified that respective requests for a terminal verification code may correspond to different remote login procedures.

The remote login method may refer to a method of outputting a terminal verification code from the target device 305. The remote login method may be determined differently according to the information of the target device 305. For example, the account server 310 may determine the remote login method using the information of the target device 305.

For example, when the target device 305 includes a display module, the account server 310 may determine the remote login method as one that outputs a PIN code or QR code on the display module of the target device 305.

For example, when the target device 305 includes a color display module, the account server 310 may determine the remote login method as one that outputs a combination of colors on the color display module of the target device 305 or one that sequentially outputs the colors.

For example, when the target device 305 includes a sound output module, the account server 310 may determine the remote login method as one that outputs a combination of voices or sounds by the sound output module of the target device 305. In this example, when the sound output module includes a voice utterance function, the account server 310 may determine the remote login method as one that outputs a combination of voices.

According to an embodiment, the account server 310 may determine the remote login method as one that outputs one or more terminal verification codes. For example, when the target device 305 includes a display module and a color display module, the account server 310 may determine the remote login method as one that outputs a PIN code and outputs a color combination.

The target device 305 may output one or more terminal verification codes according to the remote login code, and the electronic device 300 may receive at least one of the one or more terminal verification codes. For example, the electronic device 300 may perform remote login by receiving one of the PIN code that is output from the display module of a color combination that is output from the color display module, or by receiving both the PIN code and the color combination.

Although the remote login method is described above as being determined by the account server 310 according to the information of the target device 305, the remote login method may be determined according to an input received by the electronic device 300 from the user 315 as to be described below with reference to FIG. 7.

According to an embodiment, in operation S335, the electronic device 300 may request the target device 305 for the terminal verification code. For example, in operation S335, the electronic device 300 may call the account service of the target device 305 and transmit the remote login code. In addition, the electronic device 300 may transmit the remote login method to the target device 305.

For example, in operation S335, the electronic device 300 may request the terminal verification code by transmitting information including a device name (e.g., a device ID) and the remote login code to the target device 305.

When the electronic device 300 calls the account service of the target device 305, the target device 305 may perform an operation for login on the account server 310. The target device 305 may identify the remote login procedure using the remote login code transmitted from the electronic device 300.

According to an embodiment, in operation S340, the target device 305 may request the account server 310 for the terminal verification code. The target device 305 may transmit the device name, the remote login method, and the remote login code to the account server 310.

For example, in operation S340, the target device 305 may request the terminal verification code by transmitting the information including the device name, the remote login method, and the remote login code to the account server 310.

According to an embodiment, in operation S345, the account server 310 may transmit the terminal verification code to the target device 305. The terminal verification code may be at least one of a PIN code or QR code displayed on the display module, a combination of colors displayed on the color display module, or a combination of voices or sounds output from the sound output module. The account server 310 may transmit, to the target device 305, the terminal verification code corresponding to the remote login method.

According to an embodiment, in operation S350, the target device 305 may output the terminal verification code. The terminal verification code, which corresponds to the remote login method, may correspond to an output device of the target device 305. The PIN code, e.g., 1A3B shown in FIG. 3, may be an example terminal verification code that is output from the display module of the target device 305, and a terminal verification code that includes a combination of colors or a combination of voices or sounds not shown in FIG. 3 may also be output.

According to an embodiment, in operation S355, the electronic device 300 may receive the terminal verification code input from the user. For example, the electronic device 300 may provide an interface for inputting the terminal verification code according to the remote login method.

According to an embodiment, in operation S360, the electronic device 300 may transmit, to the account server 310, the terminal verification code input from the user 315. In operation S360, the electronic device may request the account server 310 for a login key. The login key may refer to a code for logging in with a user account.

For example, in operation S360, the electronic device 300 may request the login key by transmitting information including the remote login code and the terminal verification code to the account server 310.

To request the login key, the electronic device 300 may use information about the user account logged in to the electronic device 300. When there is no information about the user account logged in to the electronic device 300, the electronic device 300 may receive the information about the user account from the user 315 and request the login key using the received information about the user account, in operation S360.

In operation S365, the account server 310 may transmit the login key to the electronic device 300 in response to the terminal verification code.

According to an embodiment, in operation S370, the electronic device 300 may transmit the login key to the target device 305. In operation S370, the electronic device 300 may transmit a message that allows the target device 305 to be remotely logged in to the account server 310.

According to an embodiment, in operation S375, the target device 305 may log in to the account server 310. For example, the target device 305 may request remote login to the account server 310 using the login key. The account server 310 may perform user authorization on the target device 305 using the login key. The account server 310 may transmit an access token to the target device 305 in response to the remote login of the target device 305.

For example, in operation S375, the target device 305 may remotely log in to the account server 310 by transmitting information including the remote login code and the login key to the account server 310.

For example, the target device 305 may receive a second login key for remote login from the account server 310. For example, the login key may be granted to the electronic device 300 for remote login of the target device 305. The account server 310 may perform user authorization on the target device 305 using the login key. After user authorization for the target device 305 is completed, the account server may transmit, to the target device 305, the second login key for the target device 305 to be logged in with the user account.

In operations S335, S340, S345, S360, S365, S370, and S375 of FIG. 3, the electronic device 300, the target device 305, and the account server 310 may identify a remote login request using a remote login code. For example, in operation S360, the electronic device 300 may transmit the remote login code along with a terminal verification code to the account server 310. The account server 310 may identify the remote login request using the remote login code and identify which remote login request may cause operation S360.

Figure 4:
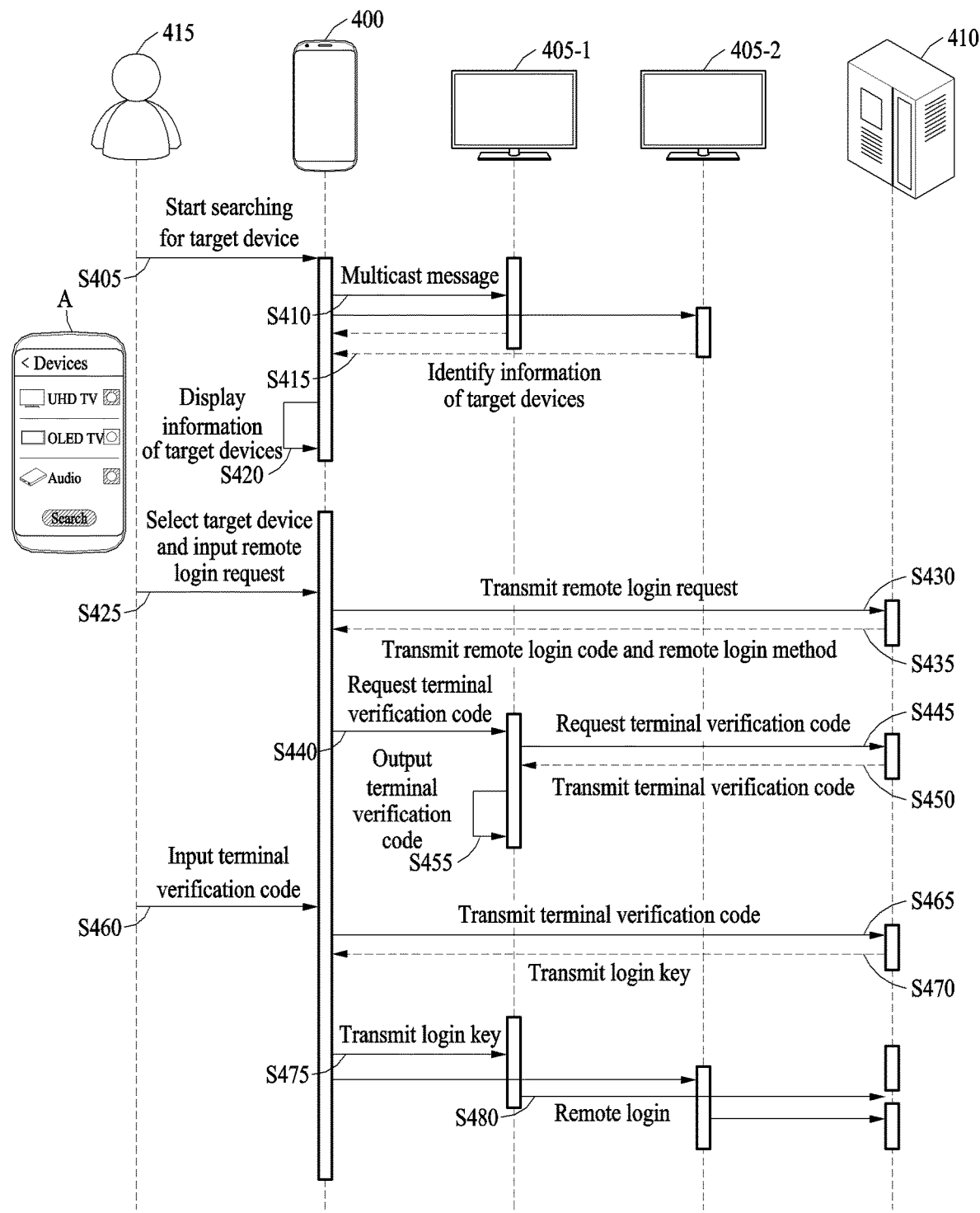
FIG. 4 is a diagram illustrating a remote authorization method for remote login of a plurality of target devices according to an embodiment of the disclosure.

FIG. 4 is a diagram illustrating a remote authorization method for remote login of a plurality of target devices according to an embodiment of the disclosure.

Referring to FIG. 4, in a remote login method for a plurality of target devices according to an embodiment, an electronic device 400 (e.g., the electronic device 100 of FIG. 1, the electronic device 201 of FIG. 2, and the electronic device 300 of FIG. 3) may allow target devices 405-1 and 405-2 (e.g., the target device 105 of FIG. 1, the electronic devices 202 and 204 of FIG. 2, and the target device 305 of FIG. 3) to be simultaneously logged in to an account server 410 (e.g., the account server 110 of FIG. 1, the server 208 of FIG. 2, and the account server 310 of FIG. 3).

Referring to FIG. 4, in operation S405, the electronic device 400 may receive, from a user 415 (e.g., the user 115 of FIG. 1 and the user 315 of FIG. 3), an input that starts searching for a target device.

According to an embodiment, the electronic device 400 may search for the target devices 405-1 and 405-2 connected to a network. In operation S410, the electronic device 400 may multicast a message for searching for the target devices 405-1 and 405-2. The message transmitted by the electronic device 400 may be transmitted to each of a plurality of target devices (e.g., 405-1 and 405-2).

According to an embodiment, in operation S415, the electronic device 400 may identify information of the plurality of target devices 405-1 and 405-2 connected to the network. Each of the plurality of target devices 405-1 and 405-2 may transmit target device information to the electronic device 400 in response to the message received from the electronic device 400.

For example, the target device information received by the electronic device 400 in operation S415 may include a device name (e.g., a device ID), a device type, an IP address, and a product name.

According to an embodiment, in operation S420, the electronic device 400 may display the information of the plurality of target devices 405-1 and 405-2. For example, the electronic device 400 may include a display module (e.g., the display module 260 of FIG. 2). The electronic device 400 may display the information of the plurality of target devices 405-1 and 405-2 on the display module.

For example, the electronic device 400 may display the information of the plurality of target devices 405-1 and 405-2, as shown in A of FIG. 4. The electronic device 400 may display a list of the plurality of target devices 405-1 and 405-2 as shown in A of FIG. 4. For example, in operation S425, the electronic device 400 may select a plurality of target devices (e.g., 405-1 and 405-2) to be remotely logged in, based on an input from the user 415. A of FIG. 4 shows an ultra-high-definition (UHD) television (TV) and an audio device that are selected by the input of the user 415 from among the plurality of target devices connected to the electronic device 400.

According to an embodiment, in operation S425, the electronic device 400 may receive, from the user 415, an input that selects the target device and requests remote login. For example, the electronic device 400 may select the target device, for example, the target device 405-1, that is to output a terminal verification code from among the plurality of target devices 405-1 and 405-2 based on the input from the user 415.

The electronic device 400 may then allow only the selected target device 405-1 among the plurality of target devices 405-1 and 405-2 to output the terminal verification code and allow the plurality of target devices 405-1 and 405-2 to be simultaneously logged in using the output terminal verification code. That is, as described below, for the target device 405-2 that does not output the terminal verification code, the electronic device 400 may perform user authorization using the terminal verification code output from the target device 405-1 and allow the target device 405-2 to be remotely logged in to the account server 410.

According to an embodiment, in operation S425, the electronic device 400 may receive, from the user 415, information of a target to be remotely logged in among the plurality of target devices 405-1 and 405-2 displayed on the electronic device.

According to an embodiment, the electronic device 400 may determine the plurality of target devices 405-1 and 405-2 to be remotely logged in based on the input of the user 415 in operation S425 and may determine the target device 405-1 to which the account server 410 outputs the terminal verification code in operation S435 described below.

That is, even when the electronic device 400 does not receive, from the user 415, the information about the target device 405-1 to which the terminal verification code is to be output in operation S425, the electronic device 400 may determine the target device 405-1 to which the account server 410 outputs the terminal verification code in operation S435.

According to an embodiment, in operation S430, the electronic device 400 may transmit a remote login request to the account server 410.

According to an embodiment, in operation S435, the electronic device 400 may receive a remote login code and a remote login method from the account server 410 in response to the remote login request.

According to an embodiment, in operation S435, the electronic device 400 may receive, from the account server 410, information about the target device 405-1 to which the terminal verification code is output. For example, the account server 410 may determine the target device 405-1 to which the terminal verification code is to be output, using the information about the plurality of target devices 405-1 and 405-2 to be remotely logged in.

For example, when the target device 405-1 includes a display and the target device 405-2 includes a sound output module, the account server 410 may determine the target device 405-1 to output the terminal verification code.

For example, when the target device 405-1 includes at least one of a display, a color display module, or a sound output module, and the target device 405-2 does not include an output device that outputs the terminal verification code, the account server 410 may determine the target device 405-1 to output the terminal verification code.

As described above, the remote login code may be used to identify the remote login request. The remote login method may be determined differently according to the information about the target device 405-1. For example, the remote login method may be determined according to the information about the target device 405-1 that is selected in operation S425 to output the terminal verification code.

According to an embodiment, in operation S440, the electronic device 400 may request the target device 405-1 that is to output the terminal verification code for the terminal verification code. In operation S445, the target device 405-1 may request the account server 410 for the terminal verification code. In operation S450, the account server 410 may transmit the terminal verification code to the target device 405-1. In operation S455, the target device 405-1 may output the terminal verification code. In operation S460, the electronic device 400 may receive the terminal verification code from the user 415. In operation S465, the electronic device 400 may transmit the terminal verification code to the account server 410. In operation S470, the account server 410 may transmit a login key to the electronic device 400.

For example, in operation S440, the electronic device 400 may request the terminal verification code by transmitting information including a device name (e.g., a device ID) and a remote login code to the target devices 405-1 and 405-2.

For example, in operation S445, the target device 405-1 may request the terminal verification code by transmitting information including the device name, the remote login method, and the remote login code to the account server 410. For operations S440, S445, S450, S455, S460, S465, and S470, the foregoing descriptions of operations S335, S340, S345, S350, S355, S360, and S365 of FIG. 3 may be applied the same, respectively. The descriptions of operations S335, S340, S345, S350, S355, S360, and S365 of FIG. 3 may thus apply the same to operations S440, S445, S450, S455, S460, S465, and S470, even though the descriptions thereof are omitted.

According to an embodiment, in operation S475, the electronic device 400 may transmit the login key to the plurality of target devices 405-1 and 405-2. The electronic device 400 may transmit the login key even to the target device 405-2 that does not output the terminal verification code, and perform a remote login procedure for the plurality of target devices 405-1 and 405-2 using one terminal verification code.

According to an embodiment, in operation S480, the plurality of target devices 405-1 and 405-2 may remotely log in to the account server 410 using the login key. The account server 410 may perform user authorization on the plurality of target devices 405-1 and 405-2 using the login key. The account server 410 may transmit an access token to the plurality of target devices 405-1 and 405-2 in response to remote login of the plurality of target devices 405-1 and 405-2.

For example, in operation S480, the plurality of target devices 405-1 and 405-2 may remotely log in by transmitting information including the remote login code and the login key to the account server 410.

For example, even in a case in which the target device 405-2 that does not output the terminal verification code does not include an output device for outputting the terminal verification code, the electronic device 400 may still perform the remote login of the target device 405-2.

For example, the target device 405-2 may transmit information of the target device 405-2 to the electronic device 400 and receive the login key from the electronic device 400. The target device 405-2 may request the account server 410 for remote login using the received login key. The account server 410 may perform user authorization using the login key and transmit the access token to the target device 405-2.

The target device 405-2 that does not output the terminal verification code may receive, from the electronic device 400, the login key transmitted to the account server 410. The login key may be one that is received from the account server 410 in response to the terminal verification code after the electronic device 400 transmits, to the account server 410, the terminal verification code output from the target device 405-1.

FIGS. 5A and 5B are diagrams illustrating a description of an account service according to various embodiments of the disclosure.

FIG. 5A shows a description of an account service of a target device (e.g., the target device 105 of FIG. 1, the target device 305 of FIG. 3, and the target devices 405-1 and 405-2 of FIG. 4) according to an embodiment, and FIG. 5B shows a description of an account service using a remote login code and a login key as parameters. According to various embodiments, information of a target device (also referred to herein as target device information) may include a description of an account service of the target device.

Referring to FIG. 5A, an electronic device (e.g., the electronic device 100 of FIG. 1, the electronic device 201 of FIG. 2, the electronic device 300 of FIG. 3, and the electronic device 400 of FIG. 4) may check whether the target device supports the account service, using the description of the account service of the target device.

For example, as shown in FIG. 5A, in a line <deviceType>, a device type of the target device may be defined as a TV. For example, as shown in FIG. 5A, in a line <freindlyName>, a name of the target device may be defined as a quantum-dot light-emitting diode (QLED) TV. For example, as shown in FIG. 5A, a line <serviceType> may correspond to a description defining whether the target device provides the account service.

Referring to FIG. 5B, it may be verified that the account service of the target device performs login (e.g., SignIn of FIG. 5B) and logout (e.g., SignOut of FIG. 5B) using a remote login code (e.g., remoteCode of FIG. 5B) and a login key (e.g., remoteKey of FIG. 5B).

As shown in FIG. 5B, <actionList> in lines 7 to 38 may define an operation performed by the target device as <action>.

For example, the target device may request output of a terminal verification code using a remote code (remoteCode) as a parameter. Referring to <action> in lines 8 to 17 in FIG. 5B, the target device may request the output of the terminal verification code (verificationCode) using the remote code (remoteCode) as the parameter.

For example, the target device may request remote login using a login key (remoteKey) as a parameter. Referring to <action> in lines 18 to 27 in FIG. 5B, the target device may request remote login (SignIn) using the login key (remoteKey) as the parameter.

For example, the target device may request remote logout using a logout key (remoteKey) as a parameter. Referring to <action> in lines 28 to 37 in FIG. 5B, the target device may request remote logout (SignOut) using the logout key (remoteKey) as the parameter.

In <serviceStateTable> in lines 39 to 48 in FIG. 5B, the remote code (remoteCode) and the login key or logout key (remoteKey) variables that are parameters of <action> may be defined. In <serviceStateTable> in FIG. 5B, the remote code (remoteCode) and the login key or logout key (remoteKey) variables may be defined as strings.

Figure 6:
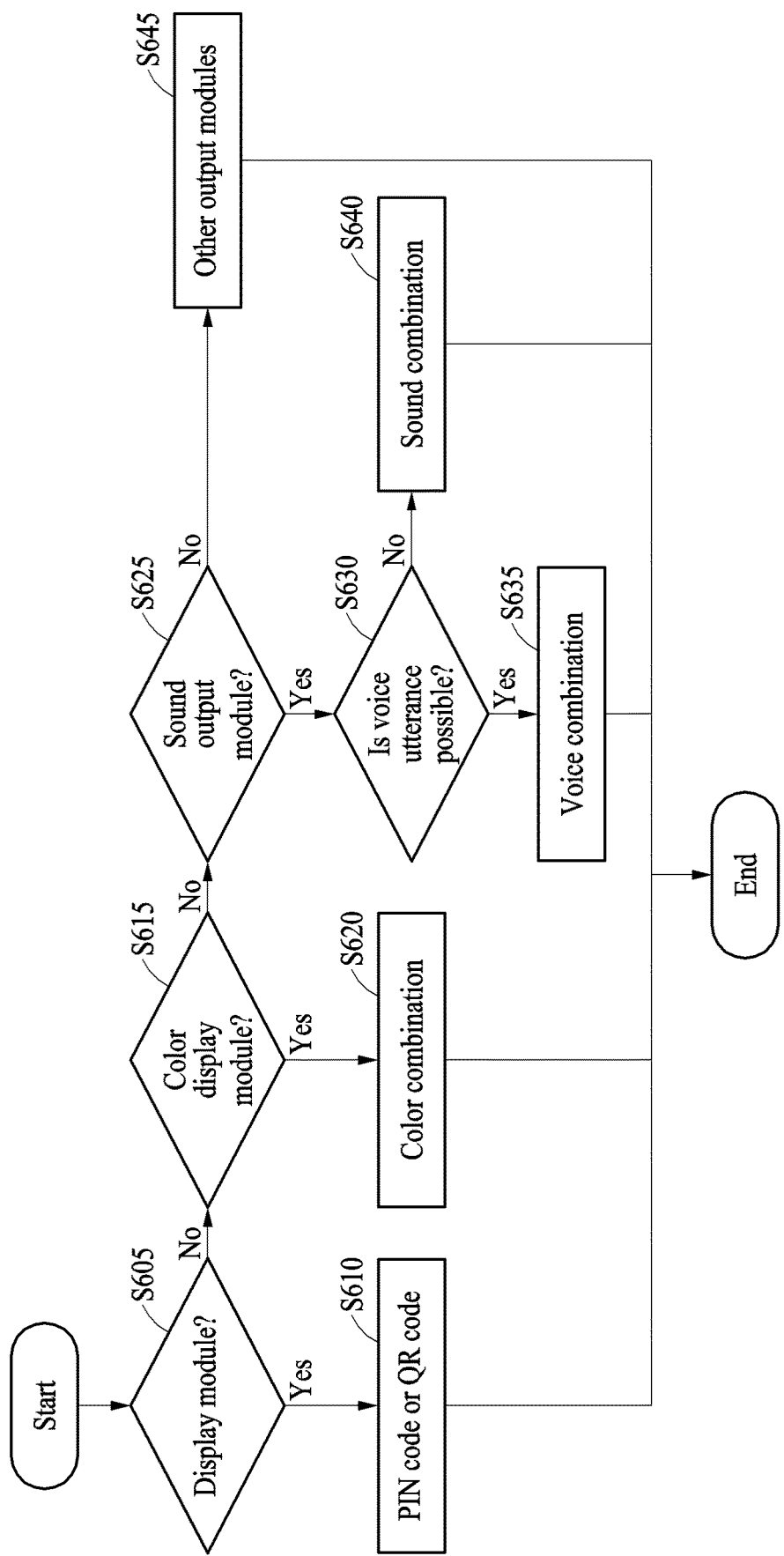
FIG. 6 is a flowchart illustrating operations performed to determine a remote login method according to an embodiment of the disclosure.

FIG. 6 is a flowchart illustrating operations performed to determine a remote login method according to an embodiment of the disclosure.

FIG. 6 shows operations performed by an account server (e.g., the account server 110 of FIG. 1, the account server 310 of FIG. 3, and the account server 410 of FIG. 4) to determine a remote login method according to an embodiment. However, the operations of determining the remote login method shown in FIG. 6 may also be performed by an electronic device (e.g., the electronic device 100 of FIG. 1, the electronic device 201 of FIG. 2, the electronic device 300 of FIG. 3, and the electronic device 400 of FIG. 4) or a target device (e.g., the target device 105 of FIG. 1, the target device 305 of FIG. 3, and the target devices 405-1 and 405-2 of FIG. 4).

Referring to FIG. 6, in operation S605, the account server may determine whether the target device includes a display module (e.g., the display module 260 of FIG. 2) using information of the target device. In operation S610, when the target device includes the display module, the account server may determine, as a remote login method, a method of outputting a PIN code or QR code to the display module of the target device.

In operation S615, when the target device does not include the display module, the account server may determine whether the target device includes a color display module. In operation S620, when the target device includes the color display module, the account server may determine, as the remote login method, a method of outputting a color combination to the color display module of the target device.

For example, the account server may determine different color combinations depending on colors that may be displayed by the color display module of the target device and the number of colors that may be displayed. For example, when the color display module may display colors such as red, blue, and yellow, and the number of colors that may be displayed is only one, the account server may determine, as the remote login method, a method of sequentially outputting the colors one by one among the colors red, blue, and yellow, for example, outputting in order of red-blue-red-yellow-blue.

In operation S625, when the target device does not include both the display module and the color display module, the account server may determine whether the target device includes a sound output module (e.g., the sound output module 255 of FIG. 2). In operation S630, when the target device includes the sound output module, the account server may determine whether voice utterance is available in the sound output module.

In operation S635, when the voice utterance is available in the sound output module, the account server may determine, as the remote login method, a method of outputting a voice combination by the sound output module.

In operation S640, when the voice utterance is not available in the sound output module, the account server may determine, as the remote login method, a method of outputting a sound combination by the sound output module.

In operation S645, when the target device does not include the sound output module in operation S625, the account server may identify other output modules of the target device and determine the remote login method according to the other output modules. For example, the other output modules may be any configuration that may output a terminal verification code, in addition to the display module, the color display module, and the sound output module.

FIG. 6 shows operations performed to determine a remote login method by sequentially determining whether a target device includes a display module, a color display module, and a sound output module. The account server is not limited to the operations of determining the remote login method shown in FIG. 6 and may arbitrarily determine the remote login method by considering an output means for outputting a terminal verification code included in the target device.

Figure 7:
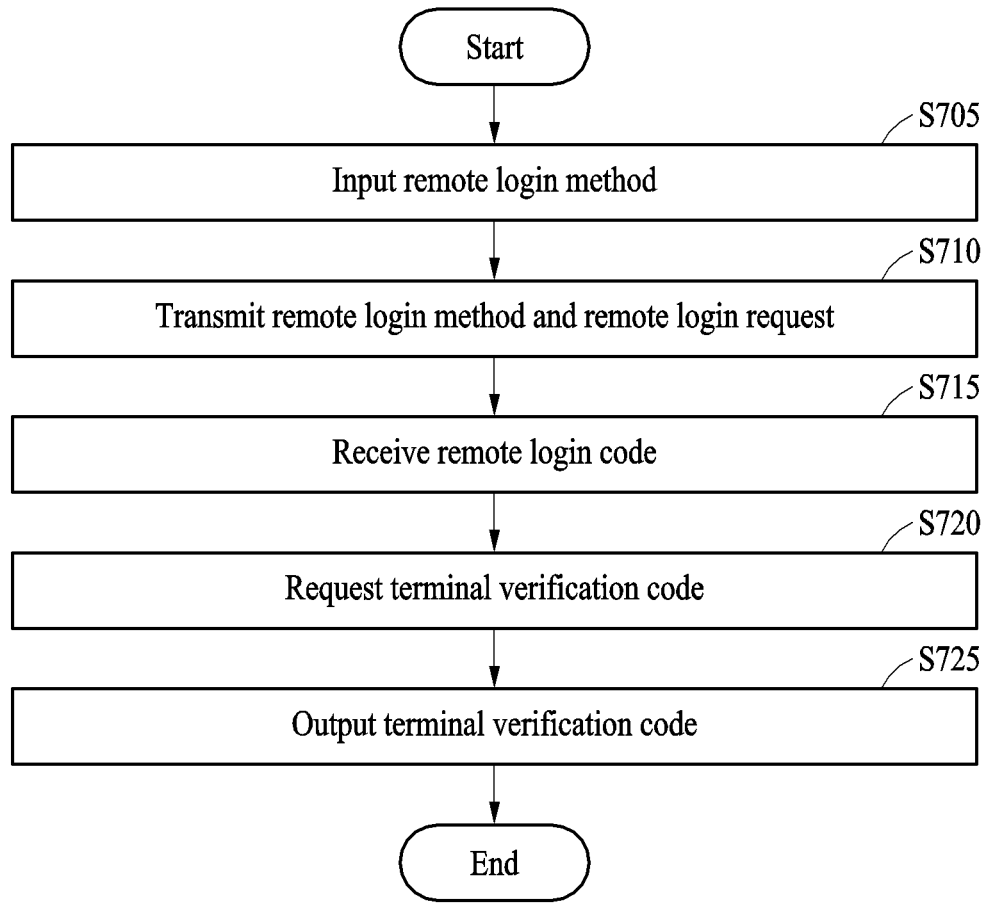
FIG. 7 is a flowchart illustrating operations performed to output a terminal verification code using a remote login method determined based on a user input according to an embodiment of the disclosure.

FIG. 7 is a flowchart illustrating operations performed to output a terminal verification code using a remote login method determined based on a user input according to an embodiment of the disclosure.

FIG. 7 shows operations performed by an electronic device (e.g., the electronic device 100 of FIG. 1, the electronic device 201 of FIG. 2, the electronic device 300 of FIG. 3, and the electronic device 400 of FIG. 4) to determine a remote login method based on an input from a user (e.g., the user 115 of FIG. 1, the user 315 of FIG. 3, and the user 415 of FIG. 4).

Referring to FIG. 7, according to an embodiment, in operation S705, the electronic device may receive a remote login method from the user. For example, the electronic device may verify a method of outputting a terminal verification code, using information of a target device. The electronic device may display a method of outputting the terminal verification code on a display module (e.g., the display module 260 of FIG. 2). The electronic device may receive, from the user, the method of outputting the terminal verification code. The electronic device may determine the remote login method based on the user input.

In operation S710, the electronic device may transmit the remote login method and a remote login request to an account server (e.g., the account server 110 of FIG. 1, the account server 310 of FIG. 3, and the account server 410 of FIG. 4). In operation S715, the electronic device may receive a remote login code from the account server.

In operation S720, the electronic device may request a target device (e.g., the target device 105 of FIG. 1, the target device 305 of FIG. 3, and the target devices 405-1 and 405-2 of FIG. 4) for the terminal verification code. The target device receiving the request for the terminal verification code may request the account server for the terminal verification code and receive the terminal verification code.

In operation S725, the target device may output the terminal verification code by an output means. The terminal verification code may correspond to the remote login method determined based on the user input.

FIGS. 8A, 8B, and 8C are diagrams illustrating a terminal verification code output from an electronic device and a screen for inputting the terminal verification code according to various embodiments of the disclosure.

FIG. 8A shows a notification A and an example screen output from a display module to receive a remote login request as an input from a user, when an electronic device 800 (e.g., the electronic device 100 of FIG. 1, the electronic device 201 of FIG. 2, the electronic device 300 of FIG. 3, and the electronic device 400 of FIG. 4) identifies target devices 805-1, 805-2, and 805-3 (e.g., the target device 105 of FIG. 1, the target device 305 of FIG. 3, and the target devices 405-1 and 405-2 of FIG. 4) connected to a network.

FIG. 8B shows a terminal verification code output by the target devices 805-1, 805-2, and 805-3 according to an embodiment. The target devices 805-1, 805-2, and 805-3 may receive the terminal verification code from an account server 810 (e.g., the account server 110 of FIG. 1, the account server 310 of FIG. 3, and the account server 410 of FIG. 4).

For example, the target device 805-1 may output a combination of colors from a color display module. Referring to FIG. 8B, the target device 805-1 may sequentially output the colors. For example, as shown in FIG. 8B, the target device 805-1 may output colors in the order of red-blue-yellow-red.

Unlike the combination of colors output by the target device 805-1 as shown in FIG. 8B, when the color display module of the target device 805-1 outputs a plurality of colors simultaneously, the target device 805-1 may output the plurality of colors simultaneously. A color of the terminal verification code may vary depending on a color output by the color output module of the target device 805-1. The account server 810 may identify whether the plurality of colors is to be output and the colors to be output, using information of the target device 805-1.

Referring to FIG. 8B, the target device 805-2 may output a combination of voices by a sound output module. As shown in FIG. 8B, the target device 805-2 may output "1S9TD" and "DREAM" as combinations of voices by the sound output module.

The account server 810 may identify whether voice utterance is available in the sound output module of the target device 805-2, using information of the target device 805-2. When the voice utterance is available in the sound output module of the target device 805-2, the account server 810 may transmit the terminal verification code which is a combination of voices to the target device 805-2.

Referring to FIG. 8B, the target device 805-3 may output a combination of sounds by a sound output module. As shown in FIG. 8B, the target device 805-3 may output sounds the number of times in the order of once, four times, twice, and three times.

When voice utterance is not available in the sound output module of the target device 805-3, the account server 810 may transmit the terminal verification code which is a combination of sounds to the target device 805-3.

FIG. 8C shows a screen output on a display module to receive a terminal verification code from a user in an electronic device (e.g., 800-1, 800-2, and 800-3) according to an embodiment.

When the terminal verification code is a combination of colors and the target device 805-1 outputs the combination of colors by a color display module, the electronic device 800-1 may output a screen for inputting the terminal verification code.

When the terminal verification code is a combination of voices and the target device 805-2 outputs the combination of voices by a sound output module, the electronic device 800-2 may output a screen for inputting the terminal verification code.

When the terminal verification code is a combination of sounds and the target device 805-3 outputs the combination of sounds by a sound output module, the electronic device 800-3 may output a screen for inputting the terminal verification code.

The electronic device (e.g., 800-1, 800-2, and 800-3) may transmit the input terminal verification code to the account server 810 and request a login key.

Figure 9:
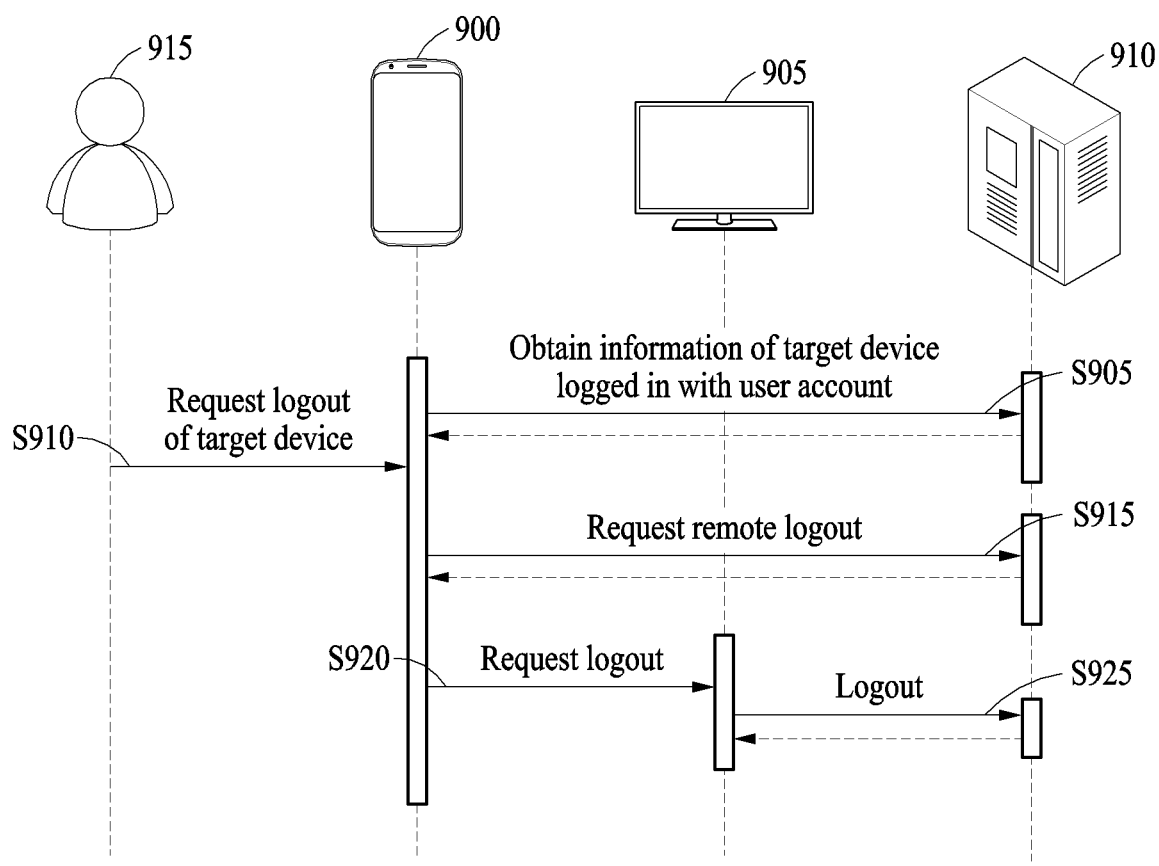
FIG. 9 is a diagram illustrating a remote authorization method for remote logout of a target device according to an embodiment of the disclosure.

FIG. 9 is a diagram illustrating a remote authorization method for remote logout of a target device according to an embodiment of the disclosure.

Referring to FIG. 9, according to an embodiment, an electronic device 900 (e.g., the electronic device 100 of FIG. 1, the electronic device 201 of FIG. 2, the electronic device 300 of FIG. 3, and the electronic device 400 of FIG. 4) may allow a target device 905 (e.g., the target device 105 of FIG. 1, the target device 305 of FIG. 3, and the target devices 405-1 and 405-2 of FIG. 4) that is logged in with a user account to be logged out.

According to an embodiment, in operation S905, the electronic device 900 may obtain, from an account server 910 (e.g., the account server 110 of FIG. 1, the account server 310 of FIG. 3, and the account server 410 of FIG. 4), information of the target device 905 that is logged in with the user account.

According to an embodiment, in operation S910, the electronic device 900 may receive a logout request for the target device 905 from a user 915.

According to an embodiment, in operation S915, the electronic device 900 may request the account server 910 for remote logout of the target device 905. The electronic device 900 may transmit the information of the target device 905 to the account server 910.

According to an embodiment, in operation S920, the electronic device 900 may request the target device 905 for logout. In operation S925, the target device 905 may request the account server 910 for logout, and the account server 910 may log the target device 905 out of the user account.

Figure 10:
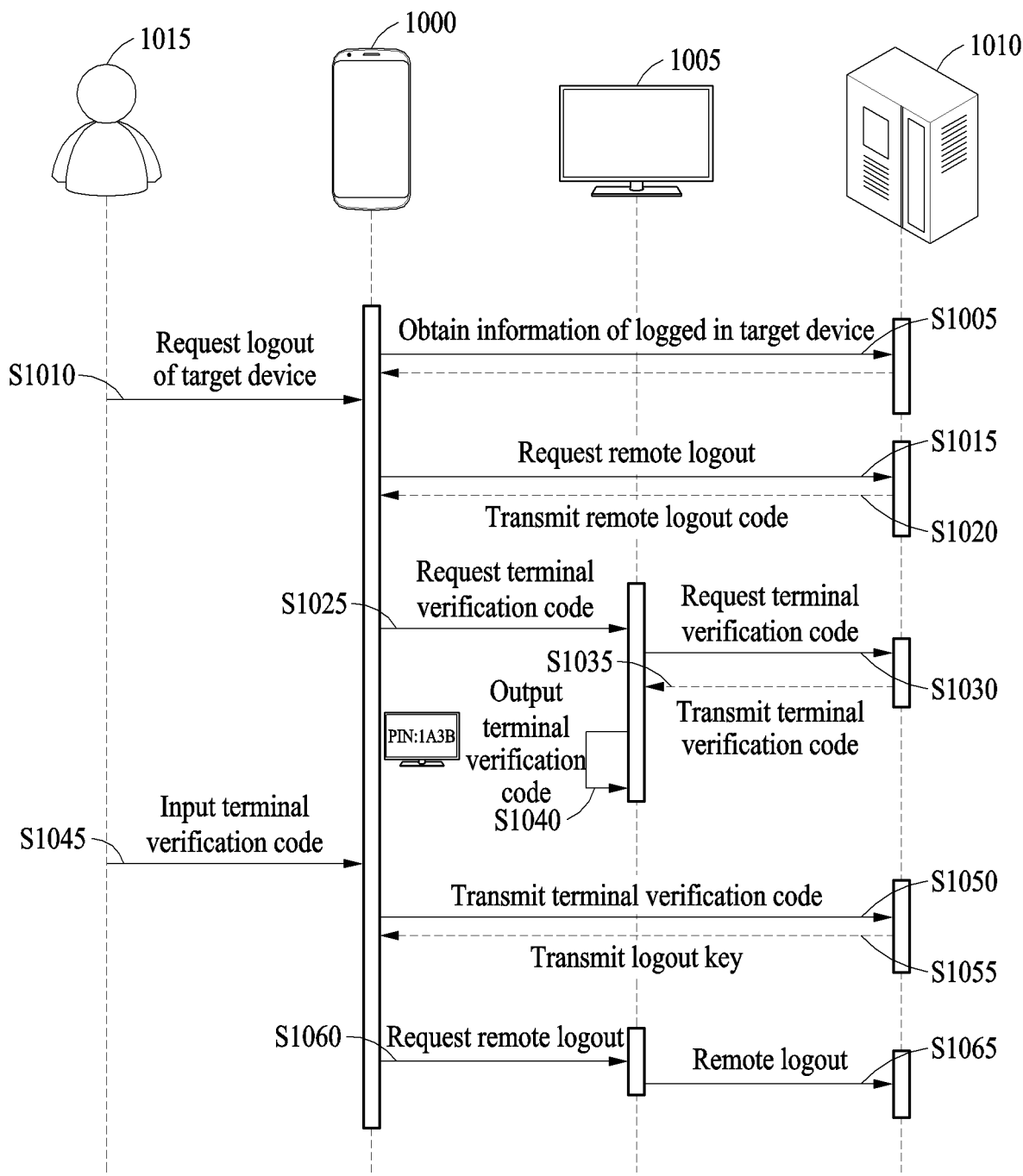
FIG. 10 is a diagram illustrating a remote authorization method for remote logout of a target device using a terminal verification code according to an embodiment of the disclosure.

FIG. 10 is a diagram illustrating a remote authorization method for remote logout of a target device using a terminal verification code according to an embodiment of the disclosure.

Referring to FIG. 10, according to an embodiment, an electronic device 1000 (e.g., the electronic device 100 of FIG. 1, the electronic device 201 of FIG. 2, the electronic device 300 of FIG. 3, and the electronic device 400 of FIG. 4) may allow a target device 1005 (e.g., the target device 105 of FIG. 1, the target device 305 of FIG. 3, and the target devices 405-1 and 405-2 of FIG. 4) that is logged in with a user account to be logged out.

According to an embodiment, in operation S1005, the electronic device 1000 may obtain, from an account server 1010 (e.g., the account server 110 of FIG. 1, the account server 310 of FIG. 3, and the account server 410 of FIG. 4), information of the target device 1005 that is logged in with the user account.

According to an embodiment, in operation S1010, the electronic device 1000 may receive a logout request for the target device 1005 from a user 1015.

According to an embodiment, in operation S1015, the electronic device 1000 may transmit the remote logout request for the target device 1005 to the account server 1010. The electronic device 1000 may transmit the information of the target device 1005 to the account server 1010.

According to an embodiment, in operation S1020, the account server 1010 may transmit a remote logout code and a remote logout method to the electronic device 1000.

The remote logout code may be construed in a similar way as the remote login code described above with reference to FIG. 3. The remote logout code, which is used to identify a remote logout request, may be used for the electronic device 1000, the target device 1005, and the account server 1010 to identify a remote login code. In this case, identifying a remote logout request may be construed as identifying whether operations are for performing the same remote logout procedure.

The remote logout method may be determined differently according to the information of the target device 1005. For example, the account server 1010 may determine the remote logout method according to an output means for outputting the terminal verification code of the target device 1005.

According to an embodiment, in operation S1025, the electronic device 1000 may request the target device 1005 for the terminal verification code. For example, the electronic device 1000 may call an account service of the target device 1005. The account service may provide a user account login service and a user account logout service of the target device 1005.

According to an embodiment, in operation S1030, the target device 1005 may request the account server 1010 for the terminal verification code.

According to an embodiment, in operation S1035, the account server 1010 may transmit the terminal verification code to the target device 1005. The terminal verification code transmitted by the account server 1010 may correspond to the remote logout method determined according to the information of the target device 1005.

According to an embodiment, in operation S1040, the target device 1005 may output the terminal verification code. FIG. 10 shows an example of how the target device 1005 outputs a terminal verification code using a method of outputting a PIN code by a display module of the target device. As described above, in addition to the method of outputting a PIN code or QR code using the display module, the target device 1005 may output the terminal verification code using a method of outputting a combination of colors by a color display module or a method of outputting a combination of voices or sounds by a sound output module.

According to an embodiment, in operation S1045, the electronic device 1000 may receive, from the user 1015, the terminal verification code output from the target device 1005. As described above, the screen displayed by the electronic device 1000 to receive the terminal verification code from the user 1015 may vary according to the remote logout method or the terminal verification code.

According to an embodiment, in operation S1050, the electronic device 1000 may transmit the terminal verification code to the account server 1010. In operation S1050, the electronic device 1000 may request the account server 1010 for a logout key.

According to an embodiment, in operation S1055, the account server 1010 may transmit the logout key to the electronic device 1000.

According to an embodiment, in operation S1060, the electronic device 1000 may request the target device 1005 for remote logout and transmit the received logout key to the target device 1005.

According to an embodiment, in operation S1065, the target device 1005 may request the account server 1010 for remote logout and transmit the received logout key to the account server 1010. The account server 1010 may perform user authorization using the logout key received from the target device 1005 and allow the target device 1005 that is logged in with the user account to be logged out.

In operations S1025, S1030, S1035, S1050, S1055, S1060, and S1065 of FIG. 10, the electronic device 1000, the target device 1005, and the account server 1010 may identify the remote logout request using the remote logout code.

The remote authorization method described above with reference to FIG. 10 may further include an operation of identifying the target device 305 logged in with the user account from the account server 310 of FIG. 3 described above, and it may be understood that the remote login request, the remote login code, and the login key that are transmitted and received for remote login of the target device 305, which are described above with reference to FIG. 3, may be replaced with the remote logout request, the remote logout code, and the logout key for logout of the target device 305, respectively.

According to various embodiments, a remote authorization method may include: identifying information of a target device (e.g., 105) (e.g., the electronic devices 201, 202, and 204 of FIG. 2, the target device 305 of FIG. 3, the target devices 405-1 and 405-2 of FIG. 4, and the target devices 805-1, 805-2, and 805-3 of FIGS. 8A, 8B, and 8C) connected to a network; transmitting a remote login request for the target device 105 to an account server (e.g., 110) (e.g., the server 208 of FIG. 2, the account server 310 of FIG. 3, the account server 410 of FIG. 4, and the account server 810 of FIGS. 8A, 8B, and 8C); receiving, from the account server 110, a remote login code for identifying the remote login request and a remote login method determined according to the information of the target device 105, in response to the remote login request; requesting the target device 105 for a terminal verification code using the remote login code; receiving, from a user (e.g., 115), the terminal verification code output from the target device 105 according to the remote login method; transmitting the terminal verification code to the account server 110; receiving a login key for remote login of the target device 105 from the account server 110; and transmitting the login key to the target device 105.

The terminal verification code may be at least one of a PIN code or QR code displayed on a display module (e.g., the display module 260 of FIG. 2) of the target device 105, a combination of colors displayed on a color display module of the target device 105, or a combination of voices or sounds output by a sound output module (e.g., the sound output module 255 of FIG. 2) of the target device 105.

The identifying of the information of the target device 105 may include determining whether the target device 105 is to perform remote login based on a message multicast from the target device 105; and identifying information about an output device that outputs the terminal verification code from the target device 105.

The identifying of the information of the target device 105 may include multicasting a message to the target device 105; and identifying whether remote login is to be performed from the target device 105 and the information about the output device that outputs the terminal verification code form the target device 105, in response to the message.

The requesting of the terminal verification code may include calling an account service of the target device 105; and transmitting the remote login code.

The target device 105 may request the account server 110 for remote login using the login key and receive an access token in response to the remote login.

There may be a plurality of target devices (e.g., the target devices 405-1 and 405-2 of FIG. 4), and in this case, the receiving of the remote login method may include receiving the remote login method that is determined according to information of a target device (e.g., the target device 405-1) that is to output the terminal verification code among the target devices 405-1 and 405-2.

The remote authorization method may further include identifying a logged-in target device (e.g., the target device 1005 of FIG. 10) from the account server (e.g., account server 1010 of FIG. 10), and the remote login request, the remote login code, the remote login method, and the login key may correspond to a remote logout request, a remote logout code, a remote logout method, and a logout key, respectively.

According to various embodiments, an electronic device performing a remote authorization method may include: a processor (e.g., the processor 220 of FIG. 2), wherein the processor 220 may be configured to: identify information of a target device 105 connected to a network; transmit a remote login request for the target device 105 to an account server 110; receive, from the account server 110, a remote login code for identifying the remote login request and a remote login method determined according to the information of the target device 105, in response to the remote login request; request the target device 105 for a terminal verification code using the remote login code; receive, from a user, the terminal verification code output by the target device 105 according to the remote login method; transmit the terminal verification code to the account server 110; receive, from the account server 110, a login key for remote login of the target device 105; and transmit the login key to the target device 105.

The terminal verification code may be at least one of a PIN code or QR code displayed on a display module (e.g., the display module 260 of FIG. 2) of the target device 105, a combination of colors displayed on a color display module of the target device 105, or a combination of voices or sounds output by a sound output module (e.g., the sound output module 255 of FIG. 2) of the target device 105.

There may be a plurality of target devices (e.g., the target devices 405-1 and 405-2 of FIG. 4), and the remote login method may be determined according to information of a target device (e.g., the target device 405-1 of FIG. 4) that is to output the terminal verification code among the target devices 405-1 and 405-2.

The processor 220 may determine whether the target device 105 may perform remote login based on a message multicast from the target device 105 and identify an output device in the target device 105 that outputs the terminal verification code.

The processor 220 may multicast a message to the target device 105, and identify whether to perform remote login from the target device 105 and information about the output device in the target device 105 that outputs the terminal verification code.

The processor 220 may identify a logged-in target device (e.g., the target device 1005 of FIG. 10) from an account server (e.g., the account server 1010 of FIG. 10), and the remote login request, the remote login code, the remote login method, and the login key may correspond to a remote logout request, a remote logout code, a remote logout method, and a logout key, respectively.

According to various embodiments, an electronic device (e.g., the target device 105 of FIG. 1, the electronic devices 201, 202, and 204 of FIG. 2, the target device 305 of FIG. 3, the target devices 405-1 and 405-2 of FIG. 4, and the target devices 805-1, 805-2, and 805-3 of FIGS. 8A, 8B, and 8C) that performs a remote authorization method may include: a processor 220, wherein the processor 220 may be configured to: transmit information of the electronic device 105 to a user terminal (e.g., the electronic device 100 of FIG. 1, the electronic device 201 of FIG. 2, the electronic device 300 of FIG. 3, the electronic device 400 of FIG. 4, and the electronic device 800 of FIGS. 8A, 8B, and 8C); receive a request for a terminal verification code using a remote login code from the user terminal 100; request an account server 110 for the terminal verification code; output the terminal verification code received from the account server 110; receive a login key from the user terminal 100; request the account server 110 for remote login using the login key; and receive an access token in response to the remote login.

The electronic device 105 may further include at least one of a display module (e.g., the display module 260 of FIG. 2) configured to display a PIN code or QR code, a color display module configured to display a combination of colors, or a sound output module (e.g., the sound output module 255 of FIG. 2) configured to output a combination of voices or sounds.

According to various embodiments, an electronic device (e.g., the electronic device 405-2 of FIG. 4) that performs a remote authorization method may include: a processor 220, wherein the processor 220 may be configured to: transmit information of the electronic device to a user terminal (e.g., the electronic device 400 of FIG. 4); receive a login key from the user terminal 400; request an account server 410 for remote login using the login key; and receive an access token in response to the remote login, wherein the login key may be one that is received by the user terminal 400 in response to a terminal verification code that is output from a target device (e.g., the target device 405-1 of FIG. 4) that is remotely logged in simultaneously along with the electronic device and is transmitted by the user terminal 400 to the account server 410.

According to various embodiments described herein, the electronic device 100 and the target device 105 may be a device of various types. The electronic device 100 and the target device 105 may include, for example, a portable communication device (e.g., a smartphone), a computer device, a portable multimedia device, a portable medical device, a camera, a wearable device, or a home appliance device. However, the electronic device 100 and the target device 105 may not be limited to the foregoing example devices.

It is to be understood that various embodiments of the disclosure and the terms used therein are not intended to limit the technological features set forth herein to particular embodiments and include various changes, equivalents, or replacements for a corresponding embodiment. As used herein, "A or B," "at least one of A and B," "at least one of A or B," "A, B, or C," "at least one of A, B, and C," and "at least one of A, B, or C," each of which may include any one of the items listed together in the corresponding one of the phrases, or all possible combinations thereof. Terms such as "1st" and "2nd" or "first" and "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., by wire), wirelessly, or via a third element.

As used in connection with some embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in the form of an application-specific integrated circuit (ASIC).

Various embodiments as set forth herein may be implemented as software (e.g., the program 240) including one or more instructions that are stored in a storage medium (e.g., the internal memory 236 or the external memory 238) that is readable by a machine (e.g., the electronic device 201). For example, a processor (e.g., the processor 220) of the machine (e.g., the electronic device 201) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method described herein may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A remote authorization method, comprising:
    identifying information of a target device connected to a network;
    transmitting, to an account server, a remote login request for the target device;
    in response to the remote login request, receiving, from the account server, a remote login code for identifying the remote login request and a remote login method determined according to the information of the target device;
    requesting the target device for a terminal verification code using the remote login code;
    receiving, from a user, the terminal verification code output by the target device according to the remote login method determined by the account server;
    transmitting the terminal verification code to the account server, and receiving a login key for remote login of the target device from the account server;
    transmitting the login key to the target device; and
    identifying a logged-in target device from the account server based on the login key.

2. The remote authorization method of claim 1, wherein the terminal verification code is at least one of:
    a personal identification number (PIN) code or a quick response (QR) code displayed on a display module of the target device;
    a combination of colors displayed on a color display module of the target device; or
    a combination of voices or sounds output by a sound output module of the target device.

3. The remote authorization method of claim 1, wherein the identifying of the information of the target device comprises:

based on a message multicast from the target device, determining whether the target device is to perform remote login; and
identifying information about an output device that outputs the terminal verification code from the target device.

4. The remote authorization method of claim 1, wherein the identifying of the information of the target device comprises:
multicasting a message to the target device; and
identifying information about whether remote login is performed from the target device and information about an output device that outputs the terminal verification code from the target device, in response to the message.

5. The remote authorization method of claim 1, wherein the requesting of the terminal verification code comprises:
calling an account service of the target device; and
transferring the remote login code.

6. The remote authorization method of claim 1, wherein the target device is configured to:
request the account server for remote login using the login key; and
receive an access token in response to the remote login.

7. The remote authorization method of claim 1,
wherein the target device comprises a plurality of devices, and
wherein the receiving of the remote login method comprises:
receiving the remote login method determined according to information of a device that outputs the terminal verification code among the plurality of devices.

8. The remote authorization method of claim 1, further comprising:
wherein the remote login request, the remote login code, the remote login method, and the login key associated with the logged-in target device, each respectively correspond to a remote logout request, a remote logout code, a remote logout method, and a logout key associated with the logged-in target device.

9. A non-transitory computer-readable storage medium storing computer-executable instructions that, when executed by a processor, cause the processor to perform operations, the operations comprising:
identifying information of a target device connected to a network;
transmitting, to an account server, a remote login request for the target device;
in response to the remote login request, receiving, from the account server, a remote login code for identifying the remote login request and a remote login method determined according to the information of the target device;
requesting the target device for a terminal verification code using the remote login code;
receiving, from a user, the terminal verification code output by the target device according to the remote login method determined by the account server:
transmitting the terminal verification code to the account server, and receiving a login key for remote login of the target device from the account server;
transmitting the login key to the target device; and
identifying a logged-in target device from the account server based on the login key.

10. An electronic device, comprising:
a processor; and
memory storing computer-executable instructions that, when executed by the processor, cause the electronic device to at least:
identify information of a target device connected to a network, and transmit a remote login request for the target device to an account server,
in response to the remote login request, receive, from the account server, a remote login code for identifying the remote login request and a remote login method determined according to the information of the target device,
request the target device for a terminal verification code using the remote login code,
receive, from a user, the terminal verification code output by the target device according to the remote login method determined by the account server,
transmit the terminal verification code to the account server, and receive a login key for remote login of the target device from the account server,
transmit the login key to the target device, and
identify a logged-in target device from the account server based on the login key.

11. The electronic device of claim 10, wherein the terminal verification code is at least one of:
a personal identification number (PIN) code or a quick response (QR) code displayed on a display module of the target device;
a combination of colors displayed on a color display module of the target device; or
a combination of voices or sounds output by a sound output module of the target device.

12. The electronic device of claim 10,
wherein the target device comprises a plurality of devices, and
wherein the remote login method is determined according to information of a device that outputs the terminal verification code among the plurality of devices.

13. The electronic device of claim 10, further comprising computer-executable instructions that, when executed by the processor, cause the electronic device to:
based on a message multicast from the target device, determine whether the target device is to perform remote login, and
identify an output device that outputs the terminal verification code from the target device.

14. The electronic device of claim 10, further comprising computer-executable instructions that, when executed by the processor, cause the electronic device to:
multicast a message to the target device, and
in response to the message, identify information about whether remote login is performed from the target device and information about an output device that outputs the terminal verification code from the target device.

15. The electronic device of claim 10, further comprising computer-executable instructions that, when executed by the processor, cause the electronic device to:
wherein the remote login request, the remote login code, the remote login method, and the login key associated with the logged-in target device, each respectively correspond to a remote logout request, a remote logout code, a remote logout method, and a logout key associated with the logged-in target device.

16. The electronic device of claim 10, further comprising computer-executable instructions that, when executed by the processor, cause the electronic device to:
- call an account service of the target device, and
- transfer the remote login code.

17. The electronic device of claim 10, wherein the target device is configured to:
- request the account server for remote login using the login key, and
- receive an access token in response to the remote login.

* * * * *